Jan. 8, 1946.　　　J. C. PATRICK　　　2,392,402
MONODISULPHIDE POLYMER
Filed Oct. 12, 1940
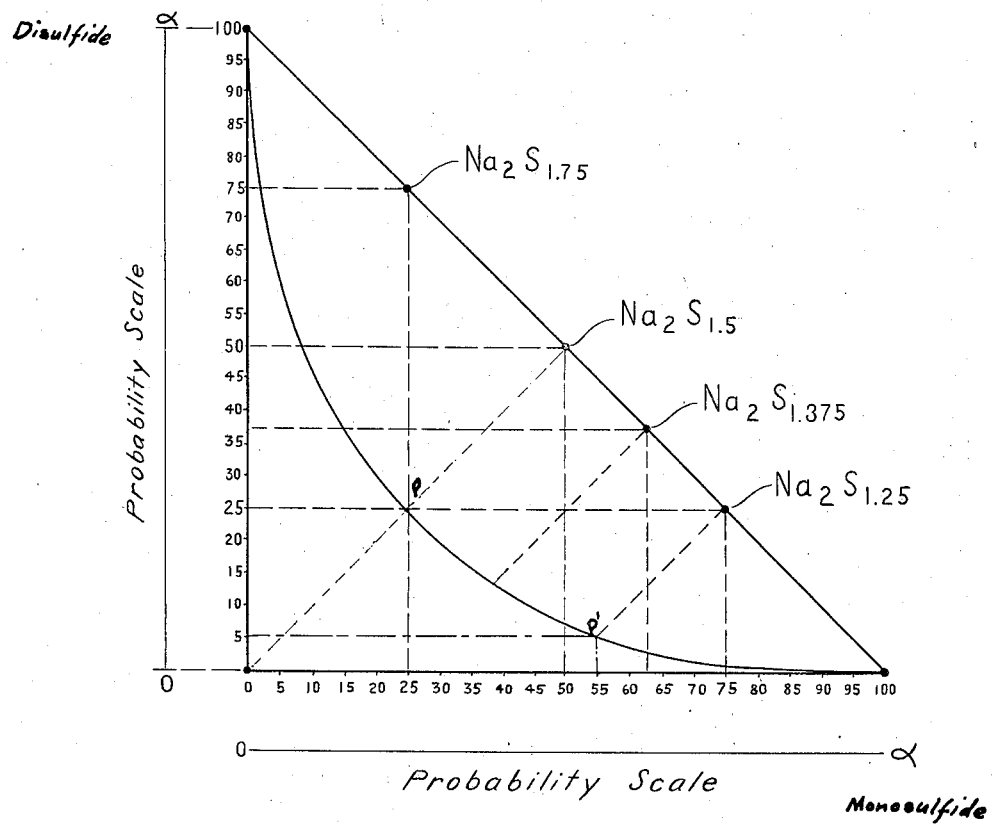
INVENTOR.
Joseph C. Patrick
BY
ATTORNEYS Patented Jan. 8, 1946

2,392,402

UNITED STATES PATENT OFFICE 2,392,402

MONODISULPHIDE POLYMER

Joseph C. Patrick, Morrisville, Pa., assignor to Thiokol Corporation, a corporation of Delaware Application October 12, 1940, Serial No. 360,876

5 Claims. (Cl. 260—79)

This invention relates to the production of polysulphide polymers and products produced therefrom.

It relates more especially to the reaction of alkaline polysulfides with organic compounds containing two adjacent carbon atoms to each of which is attached a substituent which is split off during the reaction. The more common representatives of this class of organic compounds are ethylene dichloride, propylene dichloride and other olefin dichlorides. The polymers produced by this reaction have a number of important and favorable properties and the advantage of low cost of production owing to the availability and cheapness of the olefin dichlorides, as for example, ethylene dichloride and propylene dichloride. They have, however, certain disadvantages including a bad odor and the property of evolving an offensive vapor or gas when heated, particularly in the presence of rubber.

A marked improvement is effected by opening up the space between the adjacent carbon atoms and inserting therein intervening structure as set forth in my copending application Serial No. 218,874, filed July 12, 1938, now U. S. Patent No. 2,216,044, issued September 24, 1940. Compounds possessing this intervening structure are, however, in general, relatively expensive as compared with compounds where the carbon atoms are adjacent.

It is an object of the present invention to remove the disadvantageous properties of polymers made from the adjacent carbon atom type of organic compound and secure a polymer having the properties desired in combination with low cost.

The problem of securing the desired properties in combination with low cost is one which has existed for a long time and it is an object of the present invention to solve that problem.

A polymer having the desired properties can advantageously be used to displace natural rubber because its properties are in many respects far superior to those of natural rubber. The extent of displacement, however, depends to a considerable extent upon low cost because except under extremely abnormal conditions, natural rubber is a low cost product. It is therefore of the greatest importance to obtain the necessary properties in polysulphide polymers in combination with a low cost in order to permit extensive displacement of natural rubber, by utilizing raw materials which occur or can be obtained cheaply and abundantly within the confines of the United States. Even under abnormal conditions when the price of natural rubber is high, it is highly desirable to secure the necessary properties in the polymer at low cost.

The mechanism of the reaction betwen an alkaline polysulfide and an organic compound containing two carbon atoms to each of which is attached a substituent which is split off during the reaction has been set forth in a number of my issued patents and copending applications, including the following, the disclosures of which are incorporated herein by reference:

| United States Patent No. | Issued |
| --- | --- |
| 2,142,144 | Jan. 3, 1939 |
| 2,195,380 | Mar. 26, 1940 |
| 2,206,643 | July 2, 1940 |
| 2,216,044 | Sept. 24, 1940 |
| 2,235,621 | Mar. 18, 1941 |
| 2,278,127 | Mar. 31, 1942 |
| 2,363,614 | Nov. 28, 1944 |

It has been discovered that the outstanding disadvantage of polymers made by reacting an alkaline polysulphide with an organic compound containing two adjacent carbon atoms to each of which is attached a substituent which is split off during the reaction, namely, the bad odor and evolution of offensive gas or vapor when heated, especially in the presence of rubber, is due to a substantial proportion of the following recurring radical in the polymer molecule:

When a polymer characterized by the presence of substantial proportions of this radical is heated reactions occur as follows:

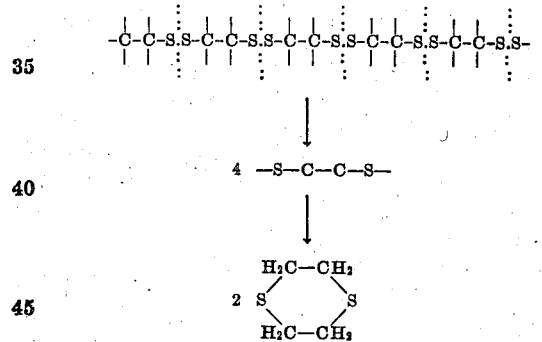

This compound has been isolated and identified as the source of the bad odor and gas evolution.

This invention is based upon this discovery and means to reduce to a negligible factor the formation in the polymer molecules of the radical or structure

In the light of the extensive disclosures of the patents and applications above identified, it is unnecessary to go into detail as to this mechanism and the following brief summary may be given.

A compound having the formula $X.R^1.X$ where $R^1$ has skeleton carbon structure selected from the groups consisting of

signifying adjacent carbon atoms and

signifying carbon atoms separated by and joined to intervening structure, and X and X' are substituents split off during the reaction, is reacted with an alkaline polysulphide.

Generically $R^1$ is defined as a radical having the skeleton carbon structure

where

is an organic radical having two carbon atoms.

Stated otherwise therefore a compound $X.R^1.X$ is reacted with an alkaline polysulphide. These compounds are bifunctional because they have two substituents X, each attached to different carbon atoms.

Polyfunctional compounds, e. g., compounds having the skeleton formulae

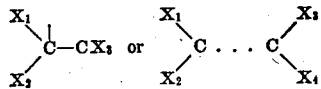

may also be used.

As a result of the reaction, substances are formed which are substantially long chain polymers of a unit consisting of the skeleton carbon structure of the organic compound united to a group of sulphur atoms of two to six depending on the number of sulphur atoms in the alkaline polysulphide, thus (1) 
(2) 
(3) 
(4) 
(5)

The units of the corresponding monosulphide reaction products are

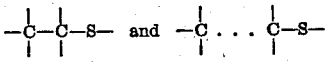

These reaction products, per se, do not polymerize as well as the polysulphide reaction products.

The substituents X, $X_1$, $X_2$, etc. unite with the cation of the alkaline polysulphide to form a salt which is a by-product. It is therefore, chemically, immaterial what these substituents are so long as they split off during the reaction. Economically, chlorine is the cheapest. Likewise, it is in general immaterial what the cation of the alkaline polysulphide is so long as it unites with and splits off the substituents $X_1$, $X_2$, $X_3$, etc. Preferably the by-product salt is a water soluble one which can be washed out and the anion of the alkaline polysulphide is preferably, therefore, an alkali metal, ammonium or substituted ammonium or an alkaline earth metal.

A study of the reaction between organic compounds containing two adjacent carbon atoms to each of which is attached a substituent which is split off in the polysulphide reaction (e. g. ethylene dichloride), and mixtures of alkaline monsulphides and disulphides from the point of view of the theory of probabilities shows that in this reaction the formation of polymers having the structure indicated below represent the more important types of possibilities. Such organic compounds are herein identified by the formula X.R.X where R is an organic radical having two adjacent carbon atoms to each of which is attached a substituent X which is split off during reaction with an alkaline polysulphide.

(1) $[-S.S-C-C-S.S-C-C-S.S-C-C-S.S-C-C-S.S-]_n$
(2) $[-S-C-C-S-C-C-S-C-C-S-C-C-S.C-C.S-]_n$
(3) $[-S.S-C-C-S.S-C-C-S.S-C-C]_n-S.C-C.S-$
(4) $[-S-C-C-S-C-C-S-C-C-S-C-C]_n-S.S-C-C-$
(5) $[-S.S-C-C-S-C-C-S.S-C-C-S-C-C-S.S-]$

In Case 1 the reaction is exclusively between the organic compound and the disulphide and therefore gives rise to a compound in which the carbon radicals are linked exclusively by disulphide or —S.S— linkages.

In Case 2 the reaction is exclusively between the organic compound and the monosulphide and the carbon radicals are therefore linked exclusively by single sulphur atoms.

In Case 3 the disulphide linkages preponderate and the monosulphide linkages are in the minority, indicating that in this reaction the alkaline disulphide has played a preponderating part and the monosulphide a minor part.

Case 4 is substantially the reverse of Case 3. Here the monosulphide or thioether linkages preponderate and the disulphide linkages are in the minority.

In Case 5 one of the replaceable substituents of the organic compound reacts with the disulphide and the other replaceable substituent with the monosulphide, giving rise to a structure where the disulphide and the monosulphide linkages periodically alternate. Case 5 represents the ideal condition as will hereinafter be more fully set forth.

It is an object of the invention to reduce to a minimum the proportion of polymers represented by Cases 1 and 3 because these are the cases where the undesired radical

is formed, and to increase to a maximum the formation of polymers shown in the structure shown in Cases 4 and 5, particularly the latter.

An examination of the polymer shown in Case 5 reveals that, not only is the undesired radical —S.S—C—C—S.S— absent but also that this polymer is a polymer of the unit

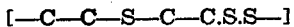

A polymer of this unit could be obtained by reacting BB' dichlor thio ethyl ether with an alkaline disulphide. BB' dichlor thio ethyl ether is a compound having two carbon atoms joined to and separated by intervening linkage, each of said carbon atoms having joined thereto substituents which are split off during the reaction. This compound is, however, expensive. Prior to the present invention the polymeric structure shown by the above polymeric structural unit could be obtained only by starting with a compound having two carbon atoms joined to and separated by intervening structure. The present invention makes possible the obtainment of similar polymeric structure by starting with a compound which does not have two carbon atoms separated by intervening structure but, on the contrary, is characterized by two adjacent carbon atoms.

The means employed to accomplish this end is based upon an application of the theory of probabilities to the polysulphide reaction.

The principles of the invention will be set forth in the claims ultimately appended hereto and will be illustrated in the following description taken in conjunction with the accompanying diagram to which reference is directed.

In this diagram the ordinates represent the percentage of disulphide and the abscissae the percentage of monosulphide in a mixture of the two. The ordinates also represent the scale of probability of the formation of polymers having the disulphide linkage as shown in Case 3 and the abscissae represent the scale of probability of the formation of polymers having a monosulphide linkage as shown in Case 4. Thus the compound identified as 100 on the ordinate scale repreesnts a solution containing substantially only alkaline disulphide and the corresponding compound on the abscissa scale represents a solution containing substantially only monosulphide. The intermediate points between these compounds and the origin represent solutions containing various mixtures of an alkaline disulphide and monosulphide. The straight line connecting the compounds identified as 100 represents the molecular composition of these various mixtures.

If ethylene dichloride, for example, is reacted with a solution containing substantially only sodium disulphide, for example, the composition of the resulting polymer will be exclusively that shown in Case 1 and in this case the probability of the formation of the disulphide linkage exclusively is infinite. Similarly, if ethylene dichloride be reacted with a solution containing substantially only monosulphide the composition of the polymer will be that shown in Case 2 and the probability of the formation of this polymer is likewise infinite.

As distinguished from the straight line or composition line, the curve connecting the two compounds mentioned has been constructed according to the mathematical theory of probabilities. The ordinates of this curve represent the probabilities of the formation of the disulphide linkage as shown in Cases 1 and 3 and the corresponding abscissae of this curve represent the corresponding probabilities of the formation of the monosulphide linkage as shown in Cases 2 and 4, respectively.

What is meant by the term "disulphide linkage" in this discussion is the recurrence of this linkage between each of the C—C radicals because it is this recurrence which gives rise to the structure

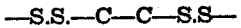
—S.S.—C—C—S.S— which is the principal cause of the bad odor and gas formation. The monosulphide linkage is harmless. Therefore, by reducing the probability of the formation of the recurring disulphide linkage to a negligible factor, the bad odor and gas formation is reduced to such a low value as to render it negligible.

The theory of probability which is employed in arriving at the present invention, may be illustrated by reference to a simple illustration such as the throwing of dice. As is well known, in playing this game use is made of cubes, each of which has six sides containing dots from 1 to 6, respectively. If one die is thrown a sufficiently large number of times the probability of throwing, for example, the six or the four or the three will be found to be one in six, and this may be demonstrated mathematically by an application of the theory of probability. On the other hand, if two dice are simultaneously thrown the probability of throwing two sixes or two threes or two fours is not one in six but is exactly one in thirty-six, as may be likewise demonstrated by the theory of probability.

In the present instance we are dealing with a reaction between a bi-functional compound such as, for example, ethylene dichloride, an alkaline monosulphide on the one hand and an alkaline disulphide on the other hand.

Let it be assumed that we have a solution containing equal numbers of molecules of disulphide and monosulphide, as will be the case in a solution made by mixing equimolecular parts of the disulphide and monosulphide, such solution having the empirical formula $Na_2S_{1.5}$. The probability of the reaction of the ethylene dichloride at one end of the molecule with the monosulphide is the same in principle as the chance of throwing, for example, a four or a six by throwing one die in the game of dice, namely, one to two, since in this instance there are equal numbers of mono and disulphide molecules, whereas with the die there are six sides. Likewise, the probability of the ethylene dichloride reacting at one end with the disulphide is the same, to wit, one in two or 50%, since we are dealing here with two possibilities and an equal number of molecules of the disulphide and monosulphide.

Again by analogy with the application of the probability to the game of dice, the probability of the reaction of the disulphide or the monosulphide, respectively, at both ends of the ethylene dichloride molecule so as to produce the undesired disulphide linkage

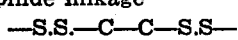
—S.S.—C—C—S.S— or the innocuous monosulphide linkage

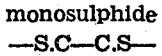
—S.C—C.S— is not one to two but is the product of these two probabilities, namely: one to four.

Consider now the case of a solution in which the ratio of alkaline disulphide to alkaline monosulphide molecules is one to three, this corresponding to an alkaline polysulphide solution having the empirical formula $Na_2S_{1.25}$. Here there are four possibilities. The probability of the reaction of the disulphide at either end of the molecule is one in four or 1/4, and the probability of the reaction of the monosulphide at either end of the molecule is three in four or 3/4. On the other hand, the probability of the disulphide reacting at both ends of the molecule is one in sixteen or 1/16, and the probability of the monosulphide reacting at both ends of the molecule is nine in sixteen or 9/16.

Therefore the probability of obtaining a polymer of the type shown in Case 3 above containing in the chain a preponderance of the

—S.S.—C—C—S.S— linkage is one in sixteen or 1/16 and the probability of obtaining a polymer of the type shown in Case 4 above having a preponderance in the chain of structure characterized by the unit

—S.C—C.S— is nine in sixteen or 9/16, it being understood that where one is dealing with a mixture of mono and disulphide molecules the resulting polymer will always contain some of the monosulphide linkages and some of the disulphide linkages. It follows from the above that in the reaction described produced by an alkaline polysulphide having the empirical formula $Na_2S_{1.25}$ about 1/16 of the polymer will have the approximate structure represented by Case 3 above, about 9/16 the structure represented by Case 4 and the remainder, which is 6/16 or 3/8, that of the structure corresponding to Case 5, which is the ideal type. Since the polymer having the structure shown in Case 4 is harmless insofar as the production of gas and odor is concerned, it follows that by reducing the proportion of disulphide molecules in the alkaline polysulphide to 1/4, the probability of the reaction of the disulphide at both ends of the organic compound to produce the undesired structure

—S.S—C—C—S.S— has been reduced to 1/16.

This will be more fully explained by reference to the accompanying diagram in which the straight line shows the composition of mixtures of sodium monosulphide and sodium disulphide, the ordinates of this line showing the percent of disulphide and the abscissae the percent of monosulphide and in which the curve is a probability curve, the ordinates or points on this curve showing the probability of the formation of the undesired disulphide linkage at both ends of the organic compound and the abscissae of these points showing the probability of the formation of the monosulphide linkage at both ends of the organic compound. Thus in a solution consisting exclusively of sodium disulphide the composition is, of course, 100% sodium disulphide excluding the water, and the probability of the reaction of disulphide at both ends of the bi-functional or poly-functional compound is infinite. In like manner a solution consisting exclusively of sodium monosulphide will contain 100% monosulphide and the probability of the formation of monosulphide linkage at both ends of the organic molecule is infinite.

The composition line in the accompanying drawing is the line connecting the 100% points and has designated thereon the empirical formulae of various polysulphide solutions corresponding to mixtures of monosulphide and disulphide in various proportions.

Consider now an alkaline polysulphide solution having equal numbers of molecules of the monosulphide and disulphide and therefore the empirical formula $Na_2S_{1.5}$ In such a case, as above explained, the probability of the formation of disulphide linkages at both ends of a polyfunctional organic compound, as for example ethylene dichloride, is 1/4 or 25%, and the same is true of the probability of the formation of monosulphide linkages at both ends. This will be seen on the accompanying drawing by following the line which connects the origin to the point of the composition curve corresponding to $Na_2S_{1.5}$, this being a line perpendicular to the composition line. This perpendicular line intersects the curve of probabilities at the point P and it will be seen that the ordinate corresponding to this point is 25% and the abscissa 25%.

Consider now an alkaline polysulphide solution having the empirical formula $Na_2S_{1.25}$ which contains a ratio of monosulphide to disulphide molecules of three to one. As above explained, the probability of the formation of the disulphide linkage at both ends of the molecule, that is to say, the undesired

—S.S—C—C—S.S— linkage (in the case of reaction with ethylene dichloride) is 1/16 or 6.25% and the probability of the formation of monosulphide linkage at both ends of the molecule to produce the linkage

—S.C—C.S— is 9/16 or 56%. In other words, the probability of the formation of a polymer having the structure above shown for Case 3 is 6.25% and the probability of the formation of a polymer having the structure shown in Case 4 is 56%. It will be understood that in such a case polymers consisting exclusively of monosulphide or disulphide linkage as shown in Cases 1 and 2 is impossible because all of the molecules will contain some monosulphide and some disulphide linkage at both ends of the —S—C— unit, Cases 1 and 2 occurring only where the solution of alkaline polysulphide consists exclusively of disulphide or monosulphide.

This will appear by reference to the accompanying drawing by following a line perpendicular to the composition curve and intersecting it at the point corresponding to $Na_2S_{1.25}$. This perpendicular line intersects the curve of probability at the point P1 above and it will be seen that the ordinate corresponding to this point is about 6.25% and the abscissa about 56%.

Therefore the probability of the formation of polymers having the compositions shown above for Cases 3 and 4 is about 62.25% and the probability of the formation of the ideal polymer shown in Case 5 is the difference between this and 100% or 37.75%. It will also be noted that of this 100% only about 6.25% is structure characterized by the undesired

—S.S—C—C—S.S— linkage. Therefore it will be furthermore seen that by reducing the proportion of sodium disulphide in the mixture thereof with sodium monosulphide to 25% or 1/4 that the formation of polymers characterized by the undesired

—S.S—C—C—S.S— linkage is reduced to 1/16.

By working within a restricted range of composition of a mixture of monosulphide and disulphide it is possible to decrease the probability of the formation of the recurring disulphide or SS linkage to such a low value that the resulting polymer is freed from the disadvantage incident thereto and from a practical standpoint it is possible to eliminate the bad odor and gas formation which has militated so strongly against these polymers in the past, and the preferred range of composition is represented by an alkaline sulphide having the formula $MS_{1.15\ to\ 1.40}$. This corresponds to a mixture of disulphide and monosulphide in which the molecular ratio of disulphide to monosulphide varies from about 15 to 40 mol percent.

By decreasing the extent of formation of the polymer represented by Cases 1 and 3 above in which the radical S.S—C—C—S.S exclusively or predominantly occurs (see Cases 1 and 3 above) another great advantage has been obtained in adition to obviating the formation of bad odor and noxious gas, namely, the proportion of the polymer having the structure shown in Case 5 is greatly increased and the significance of this lies in the fact that this polymer contains the recurring linkage

—C—C.S.C—C— from which it will be observed that in this polymer there is a recurring unit made up of a structure characterized by two carbon atoms separated by thioether linkage.

Thus by an application of the principles of this invention it is possible to secure the properties of the intervening linkage type of polymer without opening up the space between the adjacent carbon atoms and thus many of the outstanding properties of the intervening linkage type of polymer are obtained notwithstanding the fact that the raw materials worked with are of the adjacent carbon atom type and therefore readily obtainable at low cost, as already explained.

In order to provide specific examples of the large number of different reactions which can be carried out within the scope of the present invention, the following are given:

*Example 1*

In a suitable reaction vessel provided with reflux condenser and means for mechanical agitation or stirring, and also provided with heating and cooling means, are placed 200 liters of a 2-molar solution of a polysulphide having an empirical formula $Na_2S_{1.35}$ which is obtained by mixing sodium disulphide and sodium monosulphide in the ratio of 3 mols of the former and 7 mols of the latter. To this solution, with suitable agitation, are added one kilogram of caustic soda NaOH and this is followed by the addition of 2½ kilograms of crystallized magnesium chloride dissolved in about 5 liters of water. The solution is then heated to a temperature of about 140° F. and 35.6 kilograms of ethylene dichloride are added over a period of about two hours while the temperature is controlled so that it does not rise above about 165° F. as a result of the exothermic reaction.

The reaction product which is in the form of a finely divided latex and which has a specific gravity higher than that of the liquid in which it is suspended, is allowed to settle out and the supernatant liquid which contains some residual polysulphide and all of the water soluble salts formed as a result of the reaction is withdrawn. The latex is then washed until it is substantially free from soluble salts by the addition of fresh water followed by settling and removal of supernatant liquid.

Preferably the latex is then polymerized to a higher degree than that which exists at the end of the reaction. This may be accomplished by employing the principles described and claimed in my United States Patent No. 2,142,144 issued January 3, 1939, e. g., by the addition of 50 liters of a 2-molar polysulphide solution having the empirical formula of about $Na_2S_{4.5\ to\ 4.7}$. The latex is stirred and heated in the presence of this polysulphide solution for about one hour at a temperature of 210–212° F., the polysulphide acting under these conditions as an oxidizing agent. After this treatment the latex is again allowed to settle out and is purified by successive washings, as described previously. Instead of the polysulphide numerous other oxidizing agents can be employed, as more particularly set forth in my issued Patent No. 2,142,144 issued January 3, 1939.

The washed polymer may then be used in the form of a latex or it may be separated therefrom by evaporation of the water or coagulation by the use of a small amount of any suitable acid such as hydrochloric or dilute sulphuric acid added in a sufficient amount to give a reaction with methyl orange indicator. Acidification of the latex is followed by the coagulation of the material into a rubber-like mass.

The polymer thus produced, whether in the form of a latex or in solid or coagulated form, is in an intermediate form capable of being cured by a subsequent curing reaction which may be carried out as set forth in my issued patents and applications above identified.

Instead of ethylene dichloride organic compounds in general may be used, containing two adjacent aliphatic carbon atoms, e. g., carbon atoms in an aliphatic compound or in a side chain of an aromatic compound, to each of which carbon atoms is attached a substituent which is split off during the reaction. From the point of view of economy chlorine is the cheapest of such substituents but substituents in general may be used which are split off during the reaction, as set forth in my patents and applications above identified.

The compounds shown in Table I below are illustrative of the class of organic compounds above recited, the general formula of which is X.R.X where R has the skeleton carbon structure —C—C— representing two adjacent aliphatic carbon atoms to each of which is attached a substituent X which is split off during reaction with an alkaline polysulphide.

*Table I*

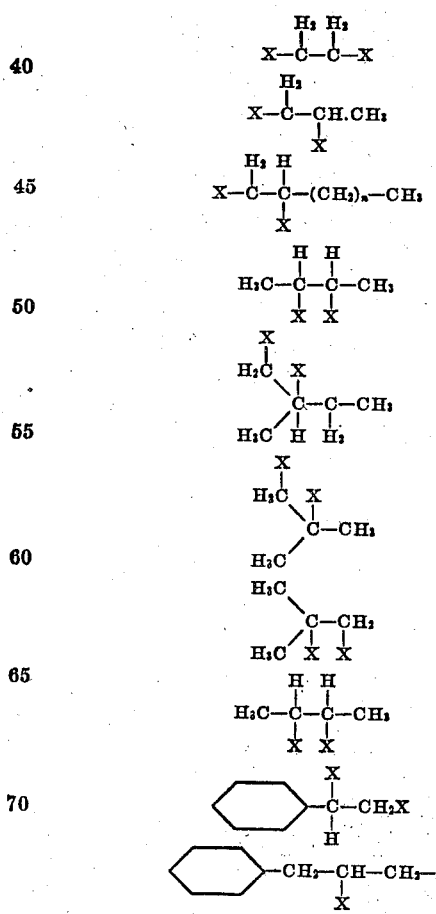

Where a single compound having the formula

X.R.X as above defined is used, the carbon structure of the resulting polymer is characterized by a symmetrical recurrence of the radical R which in some cases at least tends to produce a compound which loses its extensibility or elasticity at relatively high temperatures. However, it has been found that by introducing into the polymer a radical having different specific structure $R^1$, the symmetry of the polymeric molecule is broken up, a copolymer is formed and the resulting copolymer retains its extensibility and elasticity at lower temperatures. To attain this advantageous result the compound having the general formula $X.R^1.X$ is employed in addition to the compound having the general formula X.R.X. In the compound $X.R^1.X$, $R^1$ is a radical having skeleton carbon structure selected from the group consisting of

representing adjacent aliphatic carbon atoms and

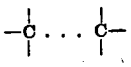

representing aliphatic carbon atoms separated by and joined to intervening structure.

As already stated, instead of defining $R^1$ in "Markush" terminology, it may be better defined, generically, by stating that $R^1$ has a skeleton structure representing two aliphatic carbon atoms to each of which is attached a substituent which is split off during the polysulphide reaction. The said carbon atoms of the skeleton structure are aliphatic carbon atoms, as for example such as occur in an aliphatic compound or in a side chain of an aryl compound. R and $R^1$ have, however, different specific structure and X has the definition already given.

It is to be noted that the radical $R^1$ includes not only the skeleton carbon structure

denoting two adjacent carbon atoms but also

denoting two carbon atoms joined to and separated by intervening linkage. Therefore, while R and $R^1$ may have the same skeleton carbon structure (but different specific structure) $R^1$ as a matter of preference has the structure

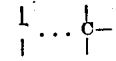

Therefore, in producing a copolymer in accordance with the present invention organic compounds, in general, having the formula X.R.X and $X.R^1.X$ are used where these formulae have the definition given.

The mixture of mono and disulphides may be reacted with a mixture of compounds X.R.X and $X.R^1.X$, or the mixture of mono and disulphides may be reacted with a compound X.R.X and a compound $X.R^1.X$ may be added to the reaction mixture at any desired stage thereof, or vice versa.

Numerous examples of compounds having the formula $X.R^1.X$ will be found in my patents and applications aforesaid. See for example Tables I, II and III in my copending application Serial No. 218,874, filed July 12, 1938, now United States Patent No. 2,216,044, issued September 24, 1940. The following, in addition to those listed above, are given as examples merely to illustrate the broad and generic scope of the formula $X.R^1.X$.

*Table II*

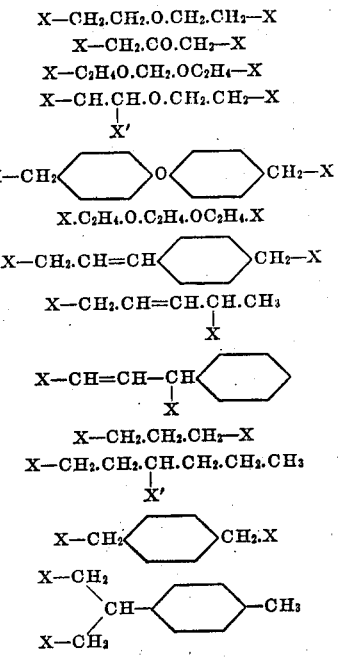

Compounds illustrated by those in Table I also illustrate the formula $X.R^1.X$ subject to the requirement that $R^1$ shall have specific structure different from the specific structure of R.

An example of the formation of a copolymer as above set forth is as follows:

*Example 2*

In a suitable vessel as described in Example 1, are placed 200 liters of a 2-molar solution of a polysulphide the empirical formula of which is $Na_2S_{1.25}$ obtained by mixing sodium disulphide and sodium monosulphide in the ratio of 3 mols of the monosulphide to one mol of the disulphide. To this solution while undergoing mechanical agitation is added one kilogram of sodium hydroxide. This is followed by the addition of 2½ kilograms of crystallized magnesium chloride dissolved in about 5 liters of water. The solution is heated to about 140° F. and 60 mols of BB' dichloro diethylether are added or 8.6 kilograms of the ether. The reaction is allowed to run on for about 15 minutes after which 300 mols of ethylene dichloride or 29.7 kilograms are added over a period of about two hours, maintaining a temperature of not to exceed 165° F. during the addition of the ethylene dichloride. After all the ethylene dichloride is in the reaction the temperature is gradually raised over a period of about one-half hour to 210° F. and held at that temperature for about 15 minutes, after which the agitator is stopped and the latex-like suspension of the polymer is allowed to settle and is then washed as in Example 1. Thereafter an oxidizing treatment is applied, as in Example 1, in order to polymerize the polymer formed and the resulting oxidized copolymer in latex form is then washed and the polymer separated from the latex as in Example 1.

In the above example BB' dichlor ethyl ether is merely one example of a large number of compounds having the formula $X.R^1.X$ and ethylene dichloride merely one of a large number of compounds having the formula X.R.X.

In this example, particularly advantageous results are obtained by substituting for the ether, compounds having the general formula $$X—R^2.O.CH_2.O.R^3—X$$

where $R^2$ and $R^3$ are alkylene radicals, e. g.

$$X—CH_2.O.CH_2.O.CH_2—X'$$
$$X—(C_2H_4).O.CH_2.O.(C_2H_4)—X'$$

that is, disubstituted dimethyl formal, disubstituted diethyl formal, disubstituted dipropyl formal, etc.

This application is a continuation-in-part of my application Serial No. 307,077, filed December 1, 1939.

I claim:

1. The process of making a polymer which comprises reacting an organic compound containing two adjacent aliphatic carbon atoms to each of which is attached a substituent which is split off during the reaction with a mixture of an alkaline disulphide and an alkaline monosulphide the molecular proportion of disulphide to monosulphide being within the range of about 15 to 40 mol percent of alkaline disulphide corresponding to an empirical formula of the mixture of disulphide and monosulphide within the range of about $MS_{1.15}$ to $MS_{1.40}$ where M is the cation of the disulphide-monosulphide mixture.

2. The process of making a polymer which comprises reacting organic compounds having the formulae X.R.X and X.R$^1$.X, where R is a radical having the skeleton carbon structure

representing adjacent aliphatic carbon atoms and R' is a radical having the skeleton carbon structure selected from the group consisting of

representing adjacent carbon atoms and

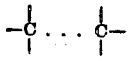

representing carbon atoms joined to and separated by intervening structure, R and R$^1$ having different specific structure, with a mixture of an alkaline disulphide and monosulphide in which the proportion of disulphide is within the range of about 15 to 40 mol percent of alkaline disulphide corresponding to an empirical formula of the mixture of disulphide and monosulphide within the range of about $MS_{1.15}$ to $MS_{1.40}$ where M is the cation of the monosulphide-disulphide mixture, X being a substituent which is split off during said reaction.

3. The process of making a polymer which comprises reacting an olefin dihalide with a mixture of an alkaline disulphide and monosulphide in which the proportion of disulphide to monosulphide is about 15 to 40 mol percent corresponding to an empirical formula of the disulphide-monosulphide mixture of $MS_{1.15}$ to $_{1.40}$ where M is the cation of the disulphide-monosulphide mixture.

4. The process of making a polymer which comprises reacting ethylene dichloride with a mixture of an alkaline disulphide and monosulphide in which the proportion of disulphide to monosulphide is about 15 to 40 mol percent corresponding to an empirical formula of the disulphide-monosulphide mixture of $MS_{1.15}$ to $_{1.40}$ where M is the cation of the disulphide-monosulphide mixture.

5. The process which comprises reacting a mixture of an ethylene dihalide and a compound having the formula X.R$^1$.X, where R$^1$ is a radical having the skeleton carbon structure

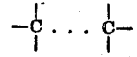

representing two carbon atoms joined to and separated by intervening structure, with a mixture of an alkaline monosulphide and disulphide having a composition expressed by the formula $MS_{1.15}$ to $_{1.40}$ where M is the cation of the monosulphide-disulphide mixture, X being a substituent which is split off during said reaction.

JOSEPH C. PATRICK.